March 26, 1968

H. W. BOTELER 3,374,522

METHOD OF MAKING DIAPHRAGM VALVE BODIES

Original Filed Aug. 19, 1960

INVENTOR.
HENRY W. BOTELER
BY
David D. McKenney
ATTORNEY

March 26, 1968    H. W. BOTELER    3,374,522
METHOD OF MAKING DIAPHRAGM VALVE BODIES
Original Filed Aug. 19, 1960    9 Sheets-Sheet 2

INVENTOR.
HENRY W. BOTELER
BY David D. McKenney
ATTORNEY

March 26, 1968  H. W. BOTELER  3,374,522
METHOD OF MAKING DIAPHRAGM VALVE BODIES
Original Filed Aug. 19, 1960  9 Sheets-Sheet 3

INVENTOR.
HENRY W. BOTELER
BY
David D. McKenney
ATTORNEY

March 26, 1968     H. W. BOTELER     3,374,522

METHOD OF MAKING DIAPHRAGM VALVE BODIES

Original Filed Aug. 19, 1960     9 Sheets-Sheet 4

*INVENTOR.*
HENRY W. BOTELER
BY
ATTORNEY

March 26, 1968     H. W. BOTELER     3,374,522
METHOD OF MAKING DIAPHRAGM VALVE BODIES
Original Filed Aug. 19, 1960     9 Sheets-Sheet 5

INVENTOR.
HENRY W. BOTELER
BY
ATTORNEY

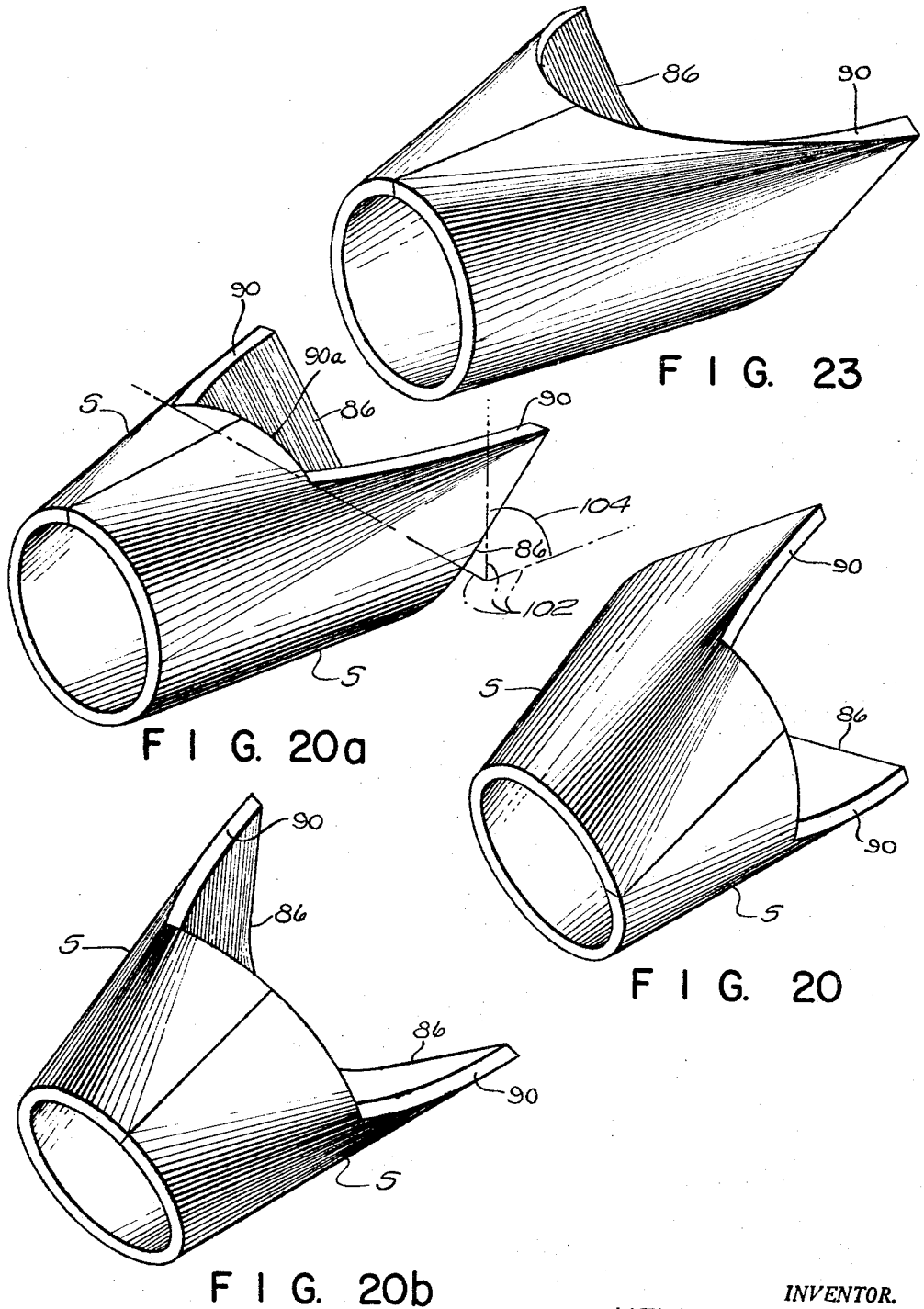

March 26, 1968   H. W. BOTELER   3,374,522
METHOD OF MAKING DIAPHRAGM VALVE BODIES
Original Filed Aug. 19, 1960   9 Sheets-Sheet 7

*INVENTOR.*
HENRY W. BOTELER
BY
ATTORNEY

March 26, 1968   H. W. BOTELER   3,374,522
METHOD OF MAKING DIAPHRAGM VALVE BODIES
Original Filed Aug. 19, 1960   9 Sheets-Sheet 9

INVENTOR.
HENRY W. BOTELER
BY
ATTORNEY 3,374,522
METHOD OF MAKING DIAPHRAGM VALVE BODIES
Henry W. Boteler, East Greenwich, R.I., assignor to Grinnell Corporation, Providence, R.I., a corporation of Delaware
Continuation of application Ser. No. 50,670, Aug. 19, 1960. This application Jan. 22, 1965, Ser. No. 432,043
1 Claim. (Cl. 29—157.1)

This application is a continuation of my prior application Ser. No. 50,670, dated Aug. 19, 1960 and now abandoned.

This invention relates to improvements in methods of making diaphragm valve bodies. More particularly it has to do with a method of fabricating diaphragm valve body from pieces at least one of which, when formed, provides a substantial portion of the flow passageway with a cross sectional shape which changes substantially, and which is characterized by the fact that from every point on one of its edges a straight line can be drawn in the surface of the piece to a point on the opposite edge.

There are in general three types of diaphragm valve bodies in use today, the so-called standard diaphragm valve body, the low weir diaphragm valve body and the no-weir diaphragm valve body. Of these by far the most popular is the standard diaphragm valve body which is essentially a cylinder with an opening on one side thereof between the cylinder ends and a weir extending nearly all the way across the flow passageway (formed by the cylinder) from the side thereof opposite the opening. In such a body the flow of fluid along the passageway from one end of the cylinder is thus deflected toward the opening by the weir. However, in the completed valve a domed flexible diaphragm is clamped to the body at the edge of the opening, and when the valve is open the deflected flow merely passes between this diaphragm and the top of the weir and then into the other end of the cylinder. The valve is closed by pressing the diaphragm against the top of the weir.

The low weir diaphragm valve body is like the standard body in all respects except that the weir does not extend as far into the passageway, for example it may extend only about half way toward the opening. Sometimes the low-weir body may have other differences over the standard body such as an oval shaped opening with its long axis extending parallel to the flow passageway. The standard body normally has a substantially circular opening.

The no-weir diaphragm valve body has, as its name indicates, no weir extending into the passageway. Accordingly, in the no-weir body the interior surface of the cylinder opposite the opening may constitute the position of the diaphragm seat, but from the opening to ends of this seat the body is provided with tapered wall surfaces to accommodate the deep cone shaped diaphragm which is required to extend from the opening to the seating on the opposite side of the cylinder.

In each of these three body styles there is a substantial change in the cross sectional shape of the flow passageway from one end of the valve to the other. Also in each of these body styles there are inevitable corners and edges in the region of the diaphragm seating and the opening.

One objective of those who manufacture diaphragm valves is the provision of as smooth a flow stream as possible under the circumstances, that is, valve bodies in which the change in cross sectional shape of the flow passageway does not take place too abruptly and in which the corners and edges are well rounded with substantial radii. This objective has led such manufacturers to make their diaphragm valve bodies principally of cast metal or molded plastic because of the opportunity afforded by these methods for the formation of almost any desired complex shape.

Accordingly, diaphragm valves with cast metal or molded plastic bodies have been made in great numbers for pipe sizes ranging from one quarter of an inch to twenty inches. However, they do have a number of disadvantages.

One such disadvantage is the very substantial investment required in foundry and plastic molding equipment. In the case of the larger valves, for example those used in pipe lines having diameters of eight inches or more, a relatively small number are sold compared to the smaller sizes used in pipe lines having diameters of from one to eight inches. At the same time the patterns for metal casting and the molds for plastic molding of such large size valves are extremely expensive. The result is a high cost per valve body. A number of attempts have been made to fabricate diaphragm valve bodies out of stock metal shapes which are sold in such quantities that their price is low, for example rolled steel sheet and plate and pipe and tubing. However, as far as is known each of the previous atempts to fabricate a diaphragm valve body has resulted either in the use of a relatively large number of separate pieces which must be joined together or in the forming of the stock into complex curves such as in the case of forging or drawing operations. The present invention makes possible the use of few pieces and simple bends.

With respect to the metal castings another disadvantage is the porosity of cast metal and the rough surface obtained. This is particularly objectionable in the case of cast stainless steel, because normally those valve users who specify cast stainless steel valve bodies also want those bodies to have a highly polished finish, and cast stainless steel is very prone to porosity, often appearing as large voids just under the casting surface and not exposed until after substantial amounts of money have been spent on grinding and polishing. Some voids discovered in this way may be filled with weld metal but this repair work is itself expensive so that as a result stainless steel diaphragm valves are very expensive. The present invention makes possible the use of stainless and other grades of steel in commerical shapes which already have a fairly good finish requiring less grinding and polishing and which have no porosity.

Still another disadvantage of cast metal diaphragm valve bodies is the difficulty which arises in applying glass or ceramic linings to them. Thus where a piping system is intended to carry corrosive fluids it is customary to employ piping and valves which have had their inside surfaces coated with a glass or ceramic lining. The cast diaphragm valve body is in one respect particularly suitable for receiving such a lining because of the general smoothness of its passageway walls and the absence of sharp corners, but even so considerable trouble has been experienced in lining some of the cast metals. Gray cast iron loses strength and hardness when it is glass lined because of the heat employed in the glass lining process. Malleable cast iron produces gases during the glass lining process, making adhesion of the glass very uncertain, and cast steel's porosity makes it difficult to obtain a good bond of the glass to the metal. The present invention makes possible the use of metal in commercial shapes with surfaces to which glass lining can be applied with the problems mentioned above substantially reduced.

The present invention arises from the discovery that a valve body may be fabricated from very few pieces of stock material and that the conventional shape of the body between each end section thereof and the weir (that is, the shape which appears in the cast metal and molded plastic bodies) is closely approximated by pieces of flat sheet or plate stock which are merely bent or wrapped into shape and joined together.

For the purpose of describing one practicing of the present invention a cast or molded diaphragm valve body of the standard type may be divided into five parts: the two end connections which are generally cylindrical, a plate-like portion which has an opening in it and against which the margin of the diaphragm is to be clamped and a pair of transition sections each of which has at one end a circular opening to fit the inner end of cylindrical end piece and each of which has at the other end an opening of the same shape as the opening in the plate on one side of the weir. In accordance with the present invention the pieces from which the body is fabricated are formed into these end connections, transition sections and plate portion, so that with a very few parts the complete body is fabricated.

The cylindrical end pieces are easily formed into the cylindrical shape by bending sheet or plate stock or by using short lengths of standard pipe or tubing, and these pieces very much resemble the corresponding sections of a cast metal or molded plastic diaphragm valve body. Similarly the plate-like portion is also easily formed from sheet or plate stock and very much resembles the corresponding portion of a cast metal or mold plastic body. However, the sections in a cast or molded diaphragm valve body corresponding to the transition sections have a very complex shape and involve surfaces bent in more than one plane so that producing a resemblance of such a section would appear to require a forming operation with stamping dies or forging equipment.

I have discovered, however, that even though each such section in a cast or molded diaphragm valve body has a complex shape it can be very nearly approximated by wrapping a single piece of flat sheet or plate stock in a special way in which its surfaces are not bent in more than one plane. The surprising and unexpected result of this discovery is that the desired openings can be obtained at the two ends of this transition piece even though these ends are not in parallel planes and even though one of these ends is not in a single flat plane. More particularly at one end this transition piece can have a circular opening matching the body end connection, and at the other end this piece can have a semi-circular opening part of which is in the plane of the plate-like portion and part of which is in the different plane formed by one side of the weir, and this result can be obtained even though the stock is only wrapped from one flat piece and is not stamped or forged.

One object of my invention is to provide an improved method of making diaphragm valves wherein the body is made up by joining together a number of parts which is a small number because certain of these parts have been formed by wrapping pieces of flat stock into novel shapes.

Another object is to provide an improved method of making diaphragm valves wherein the body is made up by joining together a plurality of parts some of which have been formed into novel shapes by being first cut out of flat stock and by then being wrapped into cone-like members.

Another object is to provide an improved method of making diaphragm valves wherein the body is made up by joining together a plurality of parts some of which have been formed into novel shapes by first wrapping stock into cone-like members and then cutting the ends of the member cone.

The best modes in which I have contemplated applying the principles of our improvements are shown in the accompanying drawings, but these are to be deemed merely illustrative for it is intended that the patent shall cover by suitable expression in the appended claim whatever of patentable novelty exists in the invention disclosed.

Figure 8:
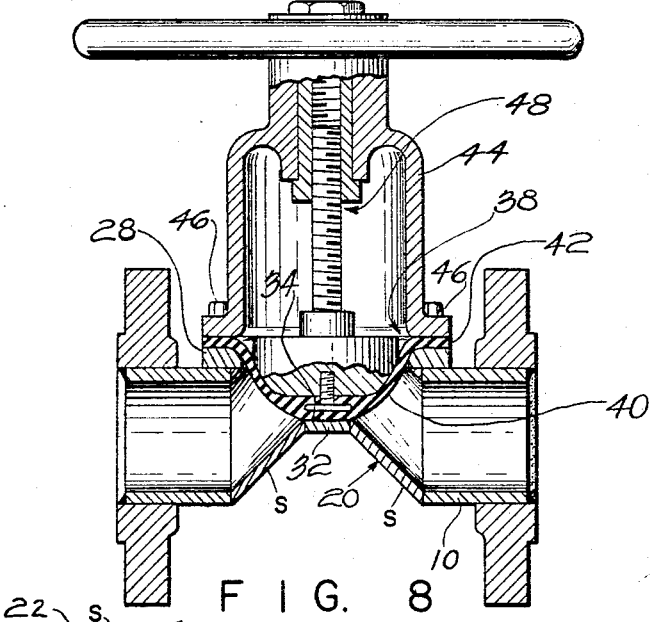
Figure 7:
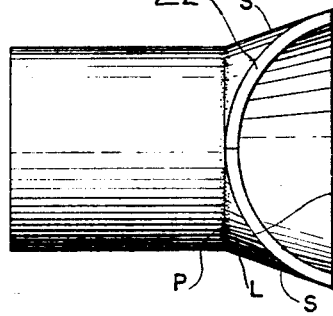
Figure 6:
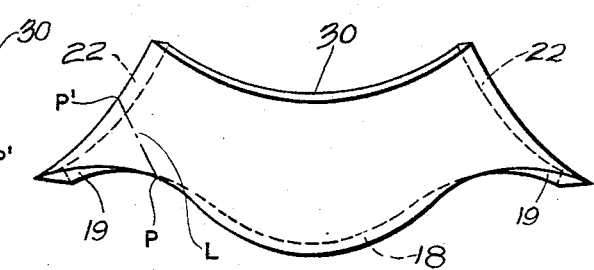
Figure 5A:
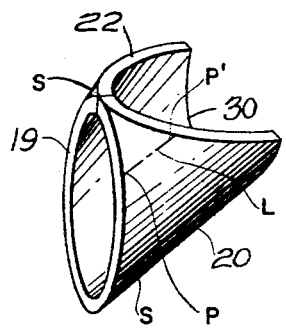
Figure 5:
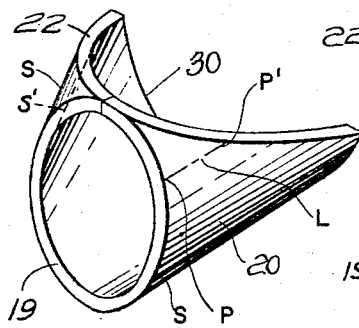
Figure 5B:
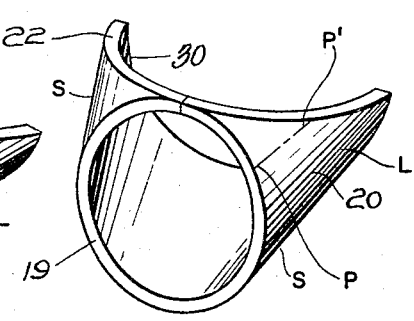
Figure 10:
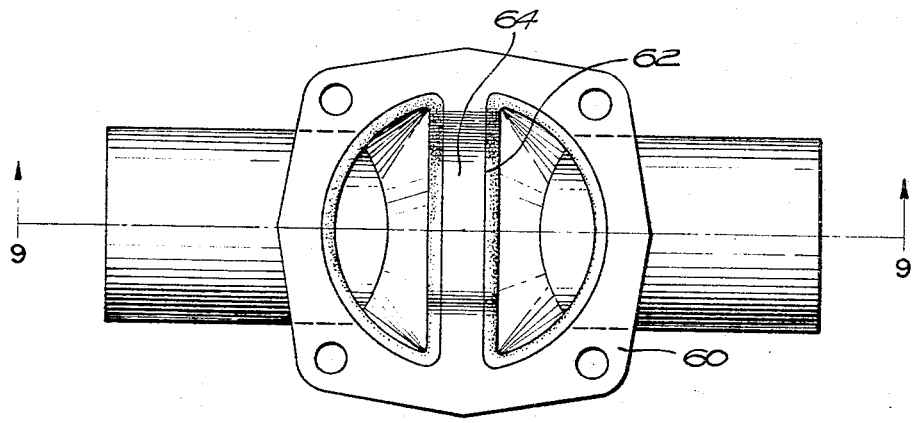
Figure 9:
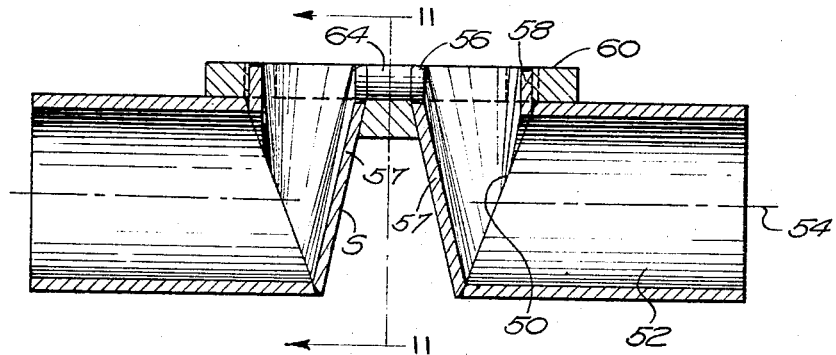
Figures 11, 12:
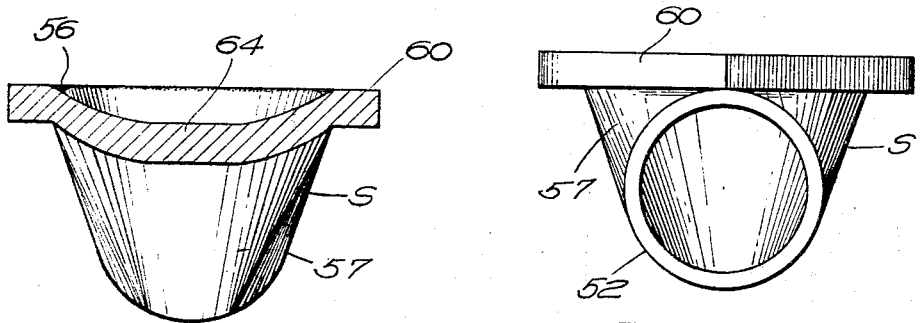
Figure 14:
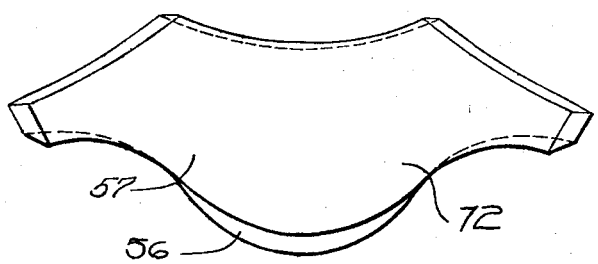
Figure 15:
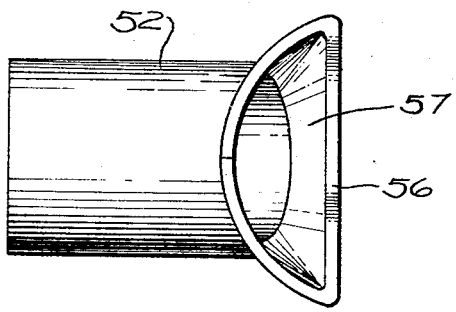
Figure 13:
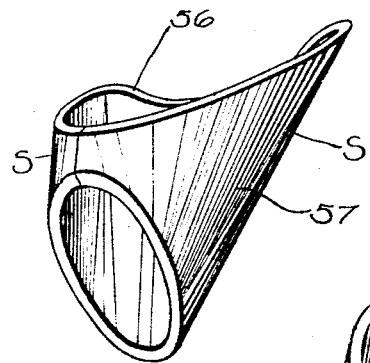
Figure 13B:
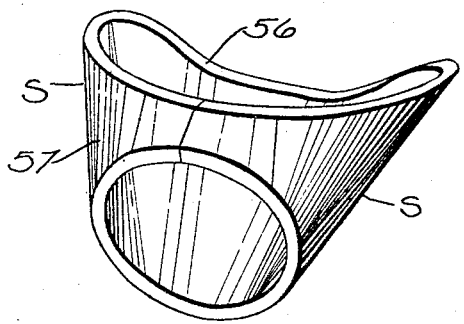
Figure 13A:
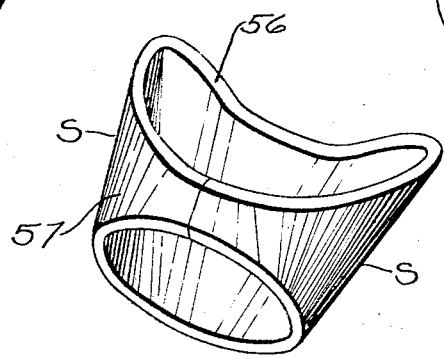
Figure 17:
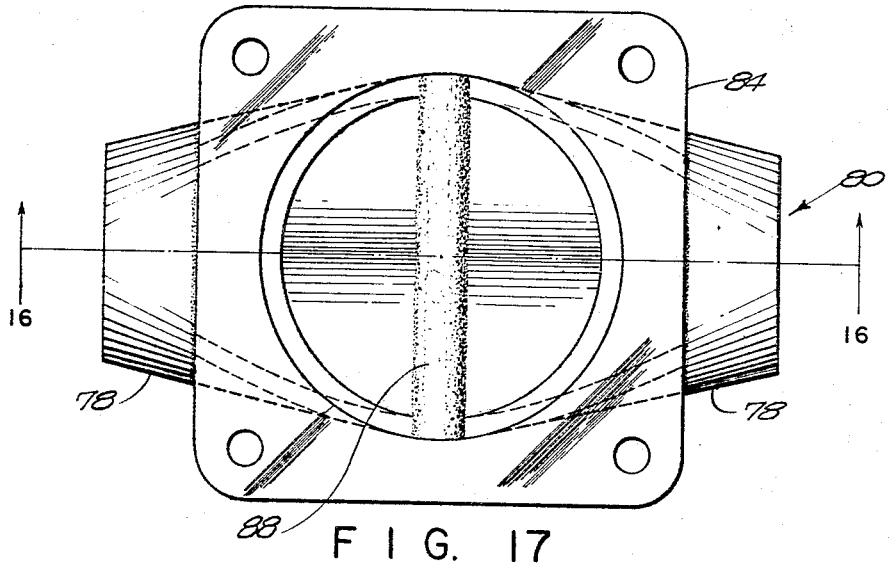
Figure 16:
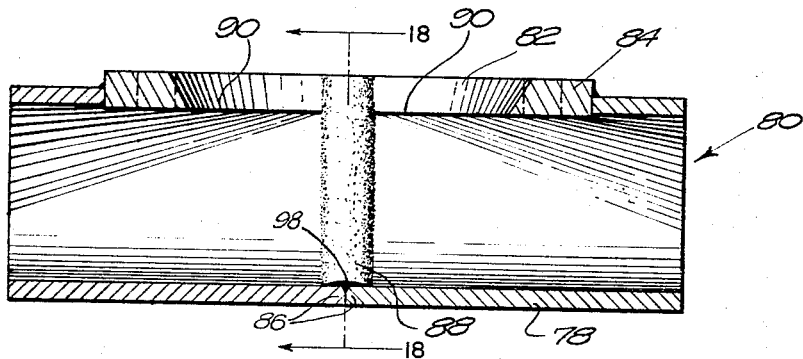
Figures 18, 19:
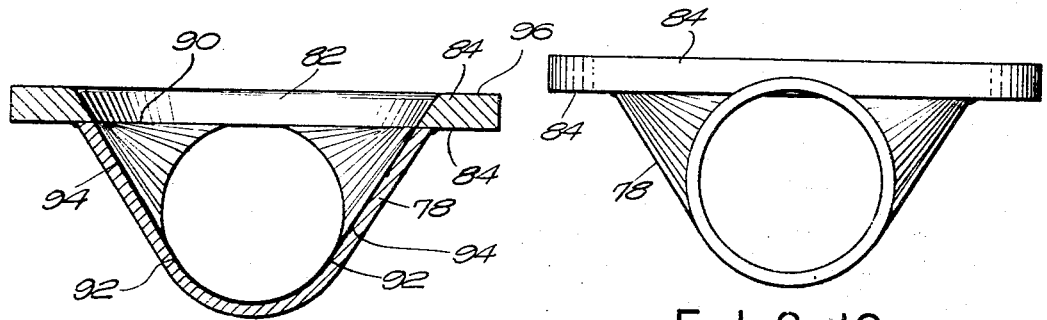
Figure 21:
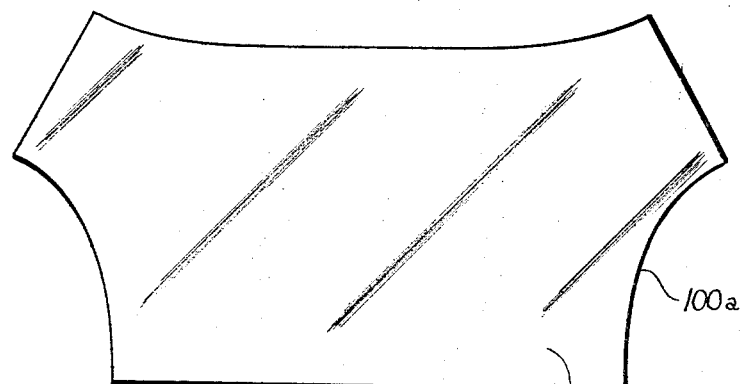
Figure 24:
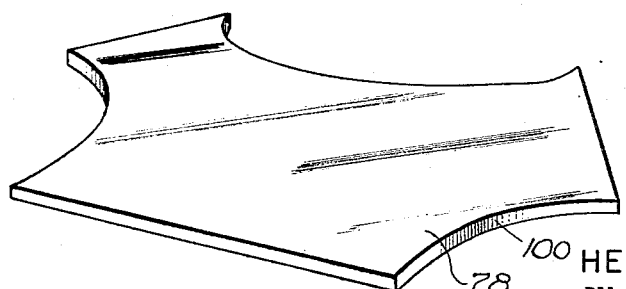
Figure 27:
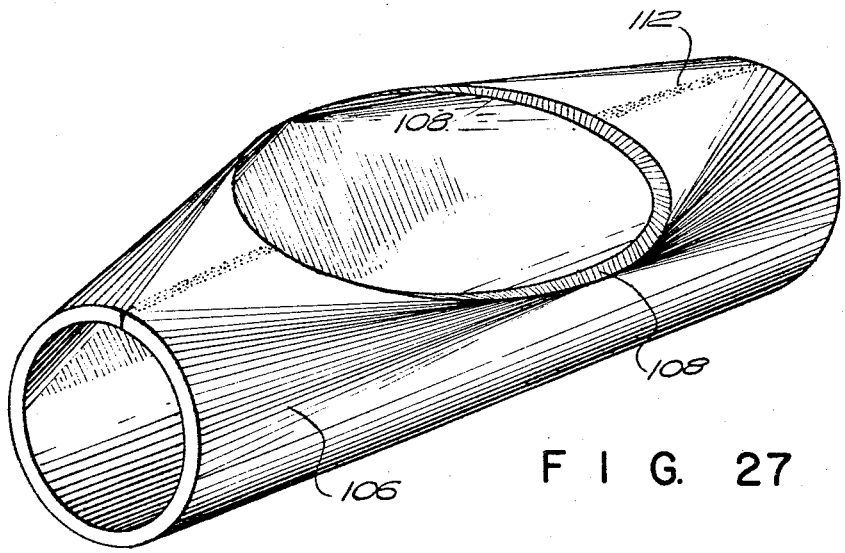
Figure 26:
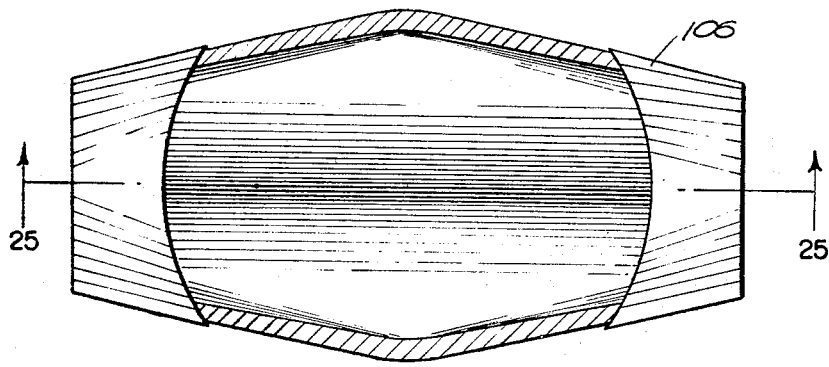
Figure 25:
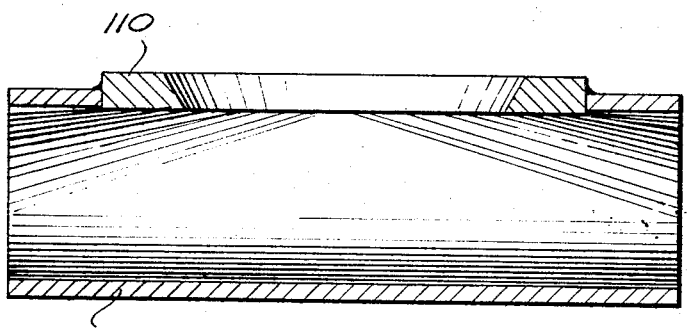
Figure 28:
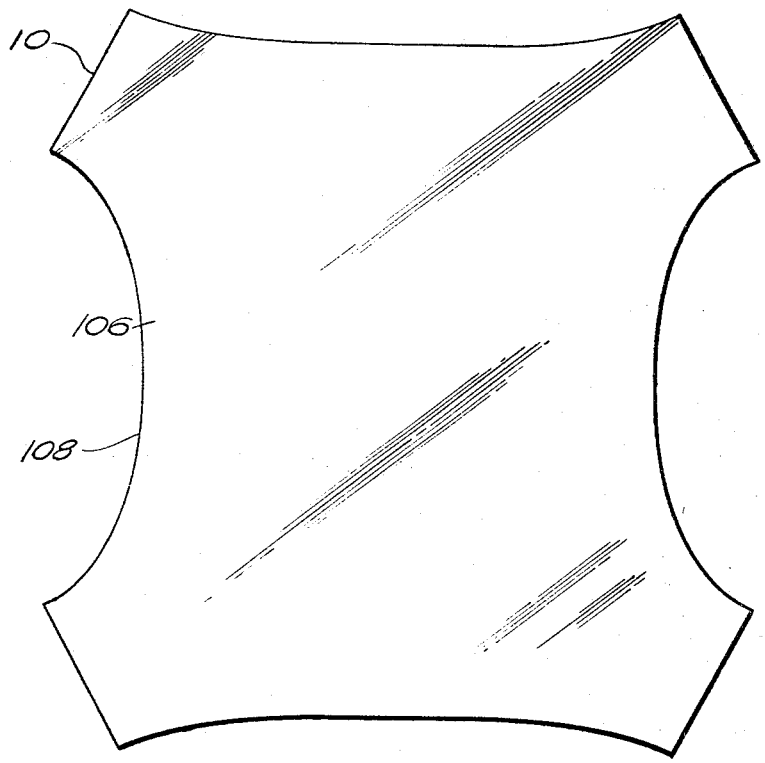
Figure 29:
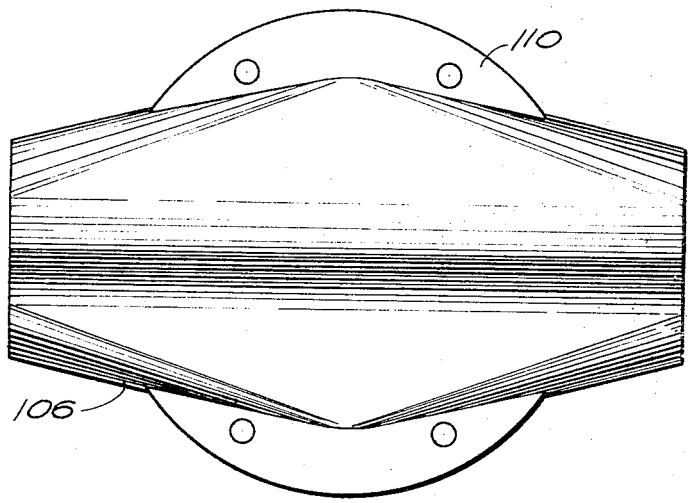

FIGURES 5, 5a, and 5b are different perspective views of one of the transition pieces used in the diaphragm valve body of FIGS. 1-4;

FIGURE 6 is a plan view showing the shape of a piece of flat sheet stock from which the transition pice of FIGS. 5, 5a and 5b is formed;

FIGURE 7 is a top plan view of a transition piece and a cylindrical end piece joined together as a sub-assembly and prior to complete assembly in a valve body like that of FIGS. 1–4;

FIGURE 8 is a cross-sectioned side elevation view of the complete valve which would use the body of FIGS. 1-4, illustrating the bonnet and the diaphragm actuating mechanism and showing the diaphragm in the closed position;

FIGURE 9 is a cross-sectioned side elevation view of another diaphragm valve body which has a standard weir and which has been made by another practicing of the method of the present invention. This view is taken on line 9—9 of FIG. 10;

FIGURE 10 is a top plan view of the diaphragm valve body shown in FIG. 9;

FIGURE 11 is a cross-sectioned end elevation view taken on line 11—11 of FIG. 9;

FIGURE 12 is an end elevation view of the diaphragm valve body shown in FIGS. 9–11;

FIGURES 13, 13a, 14 and 15 are views corresponding to FIGS. 5, 5a, 5b, 6 and 7 but relating to the diaphragm valve body shown in FIGS. 9–12;

FIGURE 16 is a cross-sectioned side elevation view of still another type of diaphragm valve body which has no weir and which has been made by still another practicing of the method of the present invention. This view is taken on line 16—16 of FIG. 17;

FIGURES 17, 18, 19, 20, 20a, 20b, 21 and 22 are views generally corresponding to FIGS. 2, 3, 4, 5, 5a, 5b, 6 and 8 but relating to the diaphragm valve body shown in FIG. 16;

FIGURE 23 is a view like FIGS. 20, 20a and 20b, but showing the transition piece before a final cutting operation;

FIGURE 24 is a perspective view of the piece shown in FIG. 21 showing the edges more clearly;

FIGURE 25 is a side elevation view illustrating still another practicing of the present invention by wrapping only one piece;

FIGURE 26 is a plan view of the wrapped piece of the body of FIG. 25 after it has been machined to receive diaphragm clamping plate;

FIGURE 27 is a perspective view of the wrapper piece of FIGURE 26 before machining;

FIGURE 28 is a plan view showing the shape of the transition piece used in the body of FIG. 25 before this transition piece is wrapped;

FIGURE 29 is a bottom plan view of the body of FIG. 25.

Referring now more particularly to FIGS. 1–4 of the drawings, the diaphragm valve body there shown has a pair of short cylindrical end pieces 10 which are spaced apart and have a common longitudinal axis 12 and each of which has its outer and inner end faces 14 and 16, respectively, at right angles to this common axis. In practice the outer ends of these end pieces are adapted to be joined to pipe ends or the like in a piping system in which the valve is to be installed, for example by being welded, screwed or flanged to pipe ends or other equipment connections. One of these joining arrangements is shown in FIG. 8 which illustrates a completed valve with a body like the one shown in FIG. 1–4 having flanged ends.

The end pieces 10 may be formed by wrapping pieces of flat stock into cylinders and welding the resulting seam, but is preferred that they be made of short sections of ordinary pipe of the proper size, grade of metal and finish.

The inner end 16 of each end piece 10 is secured preferably by welding at 17, to the outer end 18 of a transition piece 20 which, as is best shown in FIGS. 5, 5a and 5b, is generally in the shape of a distorted, truncated cone. Because the outer end 18 of each such transition piece is thus connected to the inner end 16 of the cylindrical end piece 10 this outer end 18 is circular in the plane of its end face with a diameter equal to that of the cylindrical end piece 10. This provides a relatively smooth flow passageway from the end piece 10 to the transition piece 20.

However, upwardly and inwardly (in FIG. 1) along the transition piece from the end 8 thereof toward the center of the valve body the cross-sectional shape of the transition piece 20 changes, and the plane in which the edge portion 22 of the inner end 24 lies is not parallel to the plane in which the edge portion 19 of end 18 lies. Instead edge 22 fits around the opening 26 in a diaphragm clamping plate 28. In addition the inner end 24 has another portion 30 which lies along one side of a weir piece 32 just below the top surface 34 thereof. The weir piece 32 has its ends 35 welded to the underside of the plate 28 on opposite sides thereof.

A surprising and unexpected feature of this construction is that the transition piece 20 need only be wrapped from a flat sheet or plate stock. That is to say, despite the different planes of the ends a straight line L can be drawn from any point P on the transition piece end 18 in a surface of the piece to a point P' on the inner end 24 (see FIGS. 5–7). In other words, the silhouette of the outside surface of the transition piece 20 has straight sides S when viewed from any position, and if it were possible to have a silhouette of the inside surface of the transition its sides would also always be straight lines S'. This is illustrated particularly clearly by FIGS. 5, 5a and 5b which show three perspective views of the transition piece 20 taken from different angles and in each of which the silhouette shows that the sides S are straight. No matter how the transition piece is twisted in space the silhouette shows straight sides.

The surprising result of this feature is that a valve body like that shown in FIGS. 1–4 has a shape very much like the cast and molded bodies now in use and at the same time can now be fabricated without casting, molding or forging equipment. Only wrapping or bending equipment is needed. Furthermore, the finished body is formed of a minimum of parts which can be easily held in place during joining (preferably by welding or brazing in the case of metal parts or cementing or fusing in the case of plastics) by jigs and fixtures.

In order to better describe the function of the body of FIGS. 1–4 in a diaphragm valve, FIG. 8, showing a complete valve, is included. In addition to the body already described the completed valve has a diaphragm 38 with a central bulged portion 40 and a marginal portion 42 clamped to the plate 28 around the body opening by the lower end of a bonnet 44. Bolts 46 serve to hold the body and bonnet together. The bonnet houses mechanism 48 for moving the central diaphragm portion from the closed position shown to an open position in which it is withdrawn a distance above the weir surface 34 and allows the fluid to pass thereover.

FIGS. 9–12 show that this discovery with respect to the transition pieces is not limited to one particular type of diaphragm valve body, but that the wrapped transition piece can have a variety of shapes. Thus, whereas in the embodiment of FIGS. 1–4 the inner end 16 of each end piece 10 was at right angles to the common axis 12, in FIGS. 9–12 the corresponding inner and 50 of each cylindrical end piece 52 is cut at an angle to the axis 54 which differs substantially from 90°. Also whereas in FIGS. 1–4 the edge portion 22 at the inner end of the transition piece 20 engaged the underside of the clamping plate 28 around the opening 26 and whereas the edge portion 30 extended in a deep curve along the side of the weir piece 32, in FIGS. 9–12 the corresponding edge 56 of transition piece 57 extends inside the semi-circular opening 58 in the plate 60 with the straight (in FIG. 10) portion 62 of the opening (formed by a strip 64 integral with plate) being depressed out of the plane of the remainder of the plate to form a high weir. However, despite these differences the silhouette of each of the transition pieces in FIGS. 9–12 has straight sides S so that a flat piece of sheet or plate stock properly cut out when flat (or after wrapping) will have the desired shape when wrapped as indicated herein.

The proper shape of the unwrapped transition piece for any valve body according to this invention may be determined in a number of ways including trial and error cutting. However, a preferred way is to draw on paper the two openings which represent the ends of the transition piece in their relative positions with respect to each other and in a plurality of positions (like FIGS. 5, 5a and 5b) so that a plurality of straight "silhouette" lines S around the outside surface of the transition piece are obtained and a plurality of straight "silhouette" lines S' around the inside surface of this piece are also obtained. The end locations of these silhouette lines may then be transferred by normal engineering drawing procedures to a drawing of a flat plane and will give a shape of the general type shown in FIGS. 6 and 14. This procedure should be followed for both the inside and outside surfaces of the transition piece which will result in edges 19, 22 30 and 56 which are at changing angles with respect to the planes of the surfaces of the flat sheet or plate stock before the transition piece is wrapped. For example in the embodiment of FIGS. 9–12, FIG. 14 shows how the edges 56 are shaped with respect to the flat surface 72 of this piece before it is wrapped. With such edges the proper relationship of them to the end pieces 52, plate 60 and weir strip 64 are obtained after wrapping. It will be apparent that instead of drawing the openings a three dimensional model may be constructed of these openings to obtain the locations of the ends of the silhouette lines. These locations may then be transferred to a flat plane with the same spacings between them as on the model and will give the proper flat transition piece shape.

Another method for making transition pieces of the kind described herein is to provide the proper flat transition piece shape by a method previously described herein, but then cut from flat stock pieces which are somewhat larger than indicated by the proper shape, the cuts being at any convenient angle to the flat plane of the stock, for example, at a constant right angle, then to wrap these pieces as though the excess were not present, and then to cut or grind away the excess to leave only the proper wrapped shape with edges conforming to the surfaces against which they are to abut and to which they are to be joined. In this connection if the edge of a transition piece is to be welded or brazed to the end piece and clamping plate, it may be preferred for these edges not to lie exactly parallel to the surfaces of the latter but rather to be cut with provision for a V-groove or similar gap to facilitate welding. This is shown at 76 in FIG. 1.

The advantage of this method of providing excess stock before wrapping and cutting it away after wrapping is that the proper final edge form may be more accurately achieved and it is not necessary to cut the flat stock with an edge which is at a changing angle with respect to the plane of the flat stock itself.

Figure 22:
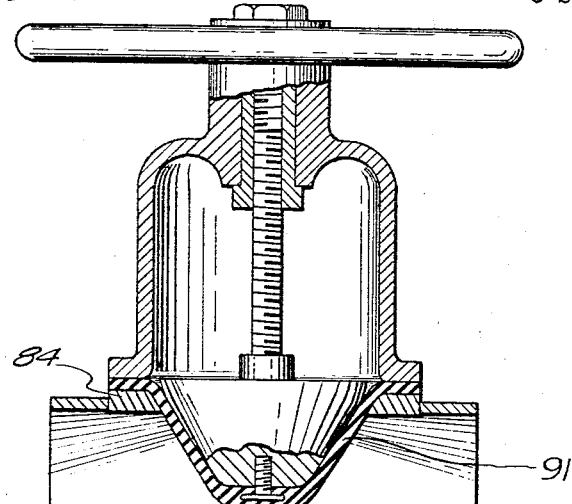

FIGURE 16 shows an embodiment of the present invention in a diaphragm valve having a body with no weir. Thus, although the most common type of diaphragm valve body has a relatively high weir like the one shown in FIGS. 9-12, diaphragm valves without any weir like the one shown in FIG. 22 are sold in substantial numbers for systems where avoidance of obstructions in the flow passageways is very important and where the shorter diaphragm life which results from the more severe diaphragm flexing can be tolerated.

In many respects the no-weir diaphragm valve body according to this invention is like the low-weir and standard types above described. As in the case of those bodies the transition piece 78 leads from the end 80 of the body to the opening 82 in the clamping plate 84. There can be, however, two substantial differences from the low-weir construction in the embodiment shown: First, the cylindrical end connections can be eliminated (although in the case of screwed joining arrangements they would probably be retained to advantage), and, second, the adjacent ends 86 of the two transition pieces can be joined together at the center of the body at 88 without the necessity for any intervening piece. They can also have edge portions 90 joined to the underside of the clamping plate 84.

Since the seating for the diaphragm extends across the valve body in the embodiment of FIGS. 16–22, the juncture 88 of the two transition pieces 78 follows the curvature of the diaphragm 91 (see FIG. 22) in its closed position. That is, it is substantially coincidental with the cylindrical flow passageway at the bottom of the body between tangent points 92 (see FIG. 18) and then diverges along upwardly sloping walls 94 to the opening 82 in the clamping plate 84 where it blends smoothly with this opening and around onto the upper side 96 of the plate.

In the case where the transition pieces 78 are made of metal and welded or brazed together the weld or brazing metal may advantageously be built up slightly on the juncture 88 to provide a raised seat 98. This provides an assurance that the diaphragm will seat along the desired line and that the unit closing pressure will be high thereby providing a tight seal.

The preparation of the transition pieces 78 in the no-weir type of diaphragm body can be accomplished by preparing the edges of the flat stock before wrapping the piece into its final form, but it is usually more convenient to use flat stock in which all the edges are conventionally cut at substantially right angles to the plane of the stock and to leave enough extra material in the edge portion 90 so that after it is wrapped into the shape shown in FIG. 23 it can be placed in a cutting machine and have its edge portion 90 dressed as indicated. The dotted lines 102 of FIG. 20a show that this dressing operation provides an angle 104 between the surfaces 90 and 90a which accommodates the plate 84 with a nice fit.

Thus the flat stock shown in FIGS. 21 and 24 is not the final cut-out shape of the transition piece, as it is in FIGS. 6 and 14, and FIGS. 20, 20a and 20b show that further cutting is done in this embodiment. As has been explained, however, it is within the scope of this invention to do the final cutting on any or all of the edges of the flat stock either before wrapping or after wrapping, whichever is more convenient.

FIGURES 25 and 29 illustrate another embodiment of the present invention in a diaphragm valve body having no-weir. In this embodiment a single transition piece 106 serves both ends of the valve body. FIGURE 28 shows that this piece 106 before wrapping is essentially two of the pieces shown in FIGS. 21 and 24 combined. FIGURE 27 shows how the single piece appears after wrapping. The twisted edge 108 is not particularly well suited in FIG. 27 to be secured to the diaphragm clamping plate 110, and accordingly FIG. 26 shows how the transition piece is cut (after welding along seams 112) to receive this clamping plate. FIGURES 25 and 29 show the clamping plate welded in position.

While one outstanding characteristic of this invention is the wrapping of the valve body transition pieces so that from any edge a straight line can be drawn in the surface of the piece to the opposite edge, it will be understood that very slight curvature of some of the silhouette lines S can result from the wrapping (or similar forming operation) and still be within the invention. The controlling factor is the resistance of the particular flat stock employed to the deformation which would produce such curvature while it is being wrapped. The benefits of the present invention may be realized as long as the forming of the transition piece is essentially a bending operation as distinguished from a cold pressing or forging operation.

*Example 1*

One example of the practice of the method of this invention to make a steel diaphragm valve body like that shown in FIGS. 1–4 of the drawings for use in a pipe line of two inch (inside diameter) Schedule 40 (American Standards Association designation) pipe is as follows. The objective is to produce the proper shape of the transition pieces before they are wrapped.

Figure 2:
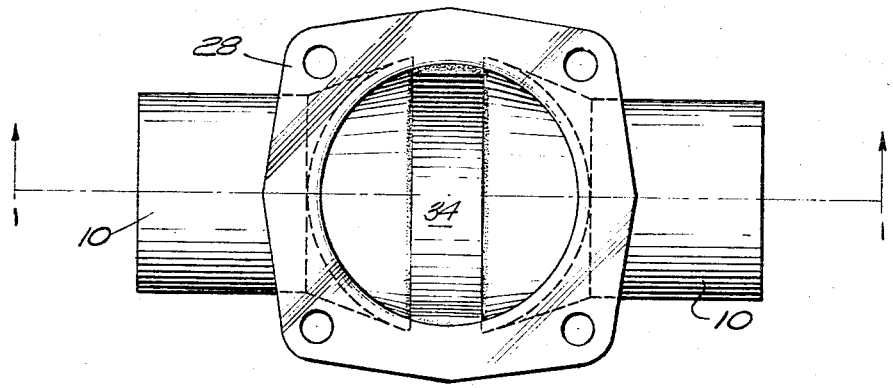
FIGURE 2 is a top plan view of the diaphragm valve body shown in FIG. 1.
Figure 1:
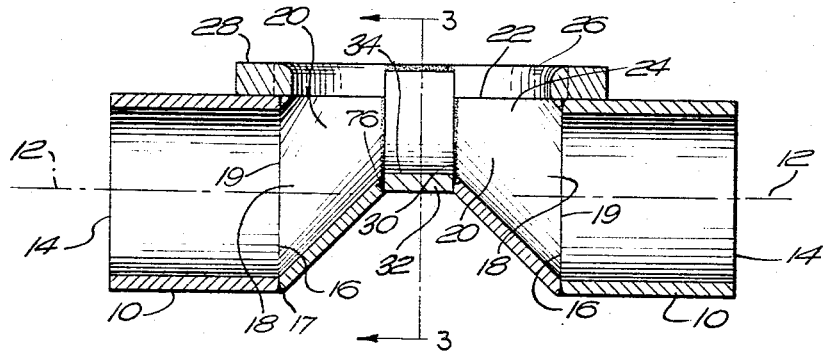
FIGURE 1 is a cross-sectioned side elevation view of a diaphragm valve body which has a relatively low weir and which has been made by one practicing of the method of the present invention. This view is taken on line 1—1 of FIG. 2.
Figure 3:
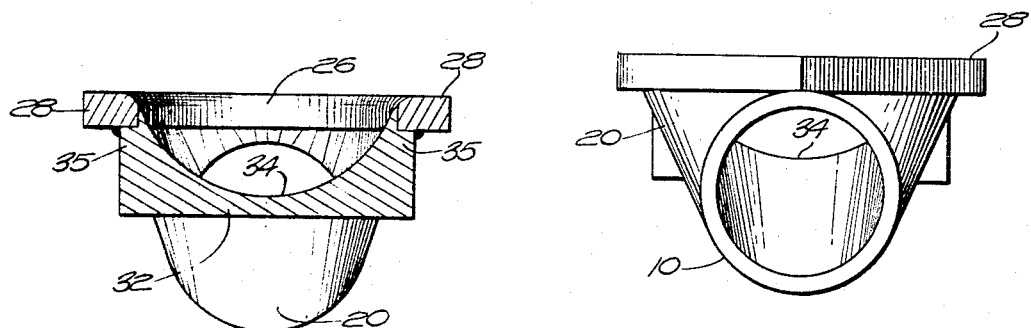
FIGURE 3 is a cross-sectioned end elevation view taken on line 3—3 of FIG. 1.
Figure 4:
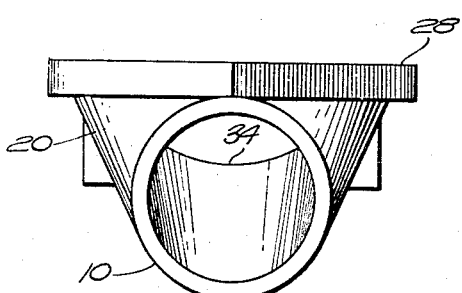
FIGURE 4 is an end elevation view of the body of FIGS. 1-3.

First a plan view is drawn of an end piece, a clamping plate and a weir piece like 10, 28 and 32 in FIGS. 1–4, each of these parts being shown in the relationship to the others which obtains in the finished body. The end piece shown in the drawing called for in this example is a section of two inch Schedule 40 pipe. The clamping plate shown in the drawing called for in this example is a flat piece of one half inch steel plate with a diaphragm opening therein of the shape and proportion to the inside end piece diameter which is shown in FIGS. 1–4. The weir piece shown in the drawing called for in this example is a flat piece of one inch steel plate with a weir surface contour substantially the same as is shown in FIG. 3.

Next the three parts above-mentioned, while maintained in the spacial relationship described, are drawn in a number of different positions arrived at by rotating the group of parts on the axis of the end piece.

Next in each of the drawings of the several positions of the group of parts "silhouette" lines are drawn where possible from the inside edge of the end piece face adjacent the clamping plate to the edge of the clamping plate opening and to the edge of the weir surface on the weir piece and additional "silhouette" lines are drawn at the same time from approximately the outside edge of the end piece face to the clamping plate and weir piece. These latter lines are spaced from the corresponding inside silhouette lines by the thickness of the plate or sheet stock to be used for the transition pieces, and this thickness in turn is determined by the average location of the outside silhouette lines (which extend from the outside edge of the end piece face) with respect to the corresponding inside silhouette lines (which extend from the inside end piece face edge). Because these silhouette lines extend from the plane of the end piece face at an angle to such plane the thickness of the transition piece stock will normally be somewhat less than the thickness of the end piece wall, and because this angle varies from group drawing to group drawing it is necessary to employ an average thickness as indicated. This presents no problem, however, because the variation which would occur in the distance between corresponding inside and outside silhouette lines (if an average were not used) would not be great, and the only effect of using an average distance is a slight mis-matching of outside edges of the end pieces and transition pieces. This mis-matching is completely obscured by the welding together of these two pieces at their juncture. The average distance referred to above need not be a calculated average. It is enough to select a suitable stock thickness by observation of several of the drawings of the group of parts.

Next the end locations of the inside and outside silhouette lines are transferred to another drawing in the relationships with respect to each other. More particularly the distances between these end locations along the end piece edges, around the clamping plate opening and along the weir piece side are measured and laid out on a flat drawing surface.

Next these end locations in this flat plane are joined in a smooth manner to provide the outline of the transition piece before wrapping.

Next two end pieces, a clamping plate and a weir piece like those drawn are manufactured in a manner well known to persons in this art, and two transition pieces having the outline drawn are cut out of a piece of flat sheet steel stock having the same composition as the other parts and having the thickness already indicated.

Next the two flat transition pieces are wrapped into substantially the shape in which they are drawn in the several group drawings described and welded where their sides meet to form distorted truncated cones like those shown in FIGS. 5, 5a and 5b. To assist in this wrapping a mandrel may be used having a surface like the inside surface of the final wrapped transition piece. The flat stock can be bent around this mandrel by suitable dies or rollers.

Next the valve body assembly is completed by welding the parts together.

*Example 2*

Another example of the practice of the method of the present invention to make a steel diaphragm valve body like that shown in FIGS. 1-4 for use in a pipe line of two inch Schedule 40 pipe is as follows:

First the same steps are followed as set forth in Example 1 up to and including the location of the silhouette lines on the several drawings of the group of parts.

Next in addition to locating the ends of these silhouette lines at the end piece edges, clamping plate and weir piece, the lines are extended somewhat beyond these ends to provide extra material in the transition piece which is to be cut out of the flat stock. The amount of the extension is not critical provided it is enough so that when the transition piece is cut out of the flat stock with the edge which is cut at a convenient angle to the plane of the stock this cut edge is everywhere beyond the edge defined by the end locations of the silhouette lines.

Next a pair of transition pieces each with the extra material are cut out of flat stock like that used in Example 1.

Next each of these extra large transition pieces is wrapped and welded into a distorted cone as though the extra material were not present.

Next the wrapped transition pieces have the extra material ground away on a flat surface grinding machine to leave end surfaces which are precisely flat and at precisely the correct angles to each other.

Next the assembly steps of Example 1 are followed to complete the valve body.

For both examples the material for the pipe sections, plates and flat stock is a carbon steel used in making ASTM A 53 (American Society for Testing Materials designation) pipe or a stainless steel such as AISI 304 (American Institute of Steel Industries designation).

I claim:
1. A method of fabricating from metal stocks which:
  (A) are flat,
  (B) are of substantially uniform thickness, a diaphragm valve body having a pair of end openings, walls extending between said end openings along either side of a longitudinal seam and with interior surfaces defining a flow passageway, a diaphragm opening through one side of said walls between said end openings and communicating with said flow passageway, a flange around said opening and a raised weir opposite said diaphragm opening and having a diaphragm seating thereon, said method comprising:
    (I) cutting each of two identical pieces of said stock with:
      (a) an end opening edge,
      (b) at least one diaphragm opening edge segment,
      (c) at least one weir engaging edge segment,
      (d) two wall seam edges,
    (II) wrapping each said piece:
      (a) until said wall seam edges abut each other,
      (b) until each point which,
        (1) is on a diaphragm opening edge segment,
        (2) is on one side surface of said piece, remains on at least one straight line which:
        (3) is completely within said one side surface of said piece,
        (4) extends to a point on one section of said end opening edge,
      (c) until each point which:
        (1) is on a weir engaging edge segment,
        (2) is on said one side surface of said piece,
      also remains on at least one straight line which:
        (3) is completely within said one side surface,
        (4) extends to a point on the remaining section of said end opening edge,
    (III) butt welding together one wall seam of each said piece to the other wall seam of said piece,
    (IV) cutting a third piece of said stocks:
      (a) a pair of diaphragm half openings separated by weir strip,
      (b) an outer edge spaced from said openings and strip,
    (V) bending depressing said weir strip into a curved diaphragm seating surface,
    (VI) welding the weir engaging edge segment of each wrapped piece to the edge of said weir strip for one half-opening,
    (VII) welding the diaphragm opening edge segment of each wrapped piece to the third piece around the remainder of said half opening.

(References on following page)

References Cited

UNITED STATES PATENTS

| | | | |
|---|---|---|---|
| 1,518,599 | 12/1924 | Murray. | |
| 1,748,772 | 2/1930 | Hunker | 113—116 X |
| 2,003,538 | 6/1935 | Hickey. | |
| 2,004,491 | 6/1935 | Luening. | |
| 2,034,418 | 3/1936 | Plant | 29—157.1 |
| 2,429,602 | 10/1947 | Boteler | 29—157.1 |
| 3,077,029 | 2/1962 | Kaye | 29—157.1 |
| 2,616,164 | 11/1952 | Tiedmann | 29—157.1 |
| 2,869,221 | 1/1959 | Siepmann | 29—157.1 |
| 2,397,373 | 3/1946 | Saunders | 251—331 |
| 2,880,961 | 4/1959 | Wynn | 251—331 |

FOREIGN PATENTS 138,368    8/1950   Australia.

OTHER REFERENCES

French, T. E., and Vierck, C. J., Manual of Engineering Drawing for Students and Draftsman, 8th ed., McGraw-Hill Book Co., Inc., New York, 1953 (pp. 249–264).

JOHN F. CAMPBELL, *Primary Examiner.*

WHITMORE A. WILTZ, ALAN COHAN, CHARLIE T. MOON, *Examiners.*

J. D. HOBART, P. M. COHEN, *Assistant Examiners.*